US006715048B1

(12) United States Patent
Kamvysselis

(10) Patent No.: US 6,715,048 B1
(45) Date of Patent: Mar. 30, 2004

(54) SYSTEM AND METHOD FOR EFFICIENTLY PERFORMING A RESTORE OPERATION IN A DATA STORAGE ENVIRONMENT

(75) Inventor: Peter Kamvysselis, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 188 days.

(21) Appl. No.: 10/109,504

(22) Filed: Mar. 28, 2002

(51) Int. Cl.[7] .............................................. G06F 12/00
(52) U.S. Cl. ...................... 711/162; 711/161; 711/114; 714/6
(58) Field of Search ........................ 711/154, 161–162, 711/4, 114; 707/202–204, 3, 10; 714/6

(56) References Cited

U.S. PATENT DOCUMENTS

| | | | | |
|---|---|---|---|---|
| 5,206,939 A | * | 4/1993 | Yanai et al. ............... 711/4 |
| 5,522,031 A | * | 5/1996 | Ellis et al. ............... 714/6 |
| 5,535,399 A | * | 7/1996 | Blitz et al. .............. 714/6 |
| 5,544,347 A | * | 8/1996 | Yanai et al. ............ 711/162 |
| 5,613,059 A | * | 3/1997 | Stallmo et al. ............ 714/6 |
| 6,047,294 A | * | 4/2000 | Deshayes et al. ....... 707/204 |
| 6,073,128 A | * | 6/2000 | Pongracz et al. .......... 707/3 |
| 6,101,497 A | * | 8/2000 | Ofek ....................... 707/10 |
| 6,397,308 B1 | * | 5/2002 | Ofek et al. .............. 711/162 |

* cited by examiner

Primary Examiner—Nasser Moazzami
(74) Attorney, Agent, or Firm—Robert Kevin Perkins; Leanne J. Fitzgerald; John M. Gunther

(57) ABSTRACT

This invention is a system and method for efficiently carrying out a restore operation in a data storage environment. The present invention is a system and method for restoring data in a manner that reduces wait time of associated resources. Logic, which is part of the invention, determines whether a restore is in progress when an application on a computer system is involved in trying to perform an I/O operation on a track of data. A protective scheme is used to keep such data from being updated while the restore is taking place. Importantly the system resources do not have to wait for the restore to complete to carry out I/O operations, which are accounted for separately from the data itself and then a synchronization occurs following completion of the restore.

19 Claims, 7 Drawing Sheets

SYSTEM AND METHOD FOR EFFICIENTLY PERFORMING A RESTORE OPERATION IN A DATA STORAGE ENVIRONMENT

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to handling of data in a data storage environment, and more particularly to a system and method for performing a restore operation efficiently in such an environment.

BACKGROUND OF THE INVENTION

As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. To minimize the chance of data loss, the computer systems also can include a backup storage system in communication with the primary processor and the data storage system. Often the connection between the one or more processors and the backup storage system is through a network in which case the processor is sometimes referred to as a "backup client."

The backup storage system can include a backup storage device (such as tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

A "restore" operation is analogous to a backup operation but the flow of data is typically from the backup device to the computer system from where it was backed up originally. For performance improvements, a backup storage architecture in which a direct connection is established between the shared storage system and the backup storage system was conceived. Such a system is described in U.S. Pat. No. 6,047,294, assigned to assignee of the present invention, and entitled Logical Restore from a Physical Backup in Computer Storage System and herein incorporated by reference.

However, even with such a system a restore operation consumes a significant amount of time and ties up computer resources, e.g. server. Not insignificant is the amount of time that such an operation makes a resource such as an application inoperable or requires computer professionals to wait for such an operation to be completed.

What is needed is a way to make the restore operation more efficient in terms of time in which resources such as software, servers, and humans have to wait for it to complete its operation. Further it would be an advantage if such an objective could be achieved without adding other cumbersome tasks or significant overhead to computer system's and computer professional's existing workload.

SUMMARY OF THE INVENTION

The present invention is a system and method for restoring data in a manner that reduces wait time of associated resources.

The method of this invention enables efficient performance of a restore operation is a data storage environment. The method includes the steps of receiving a request to perform an I/O operation on at least one track of data and in response to receiving the request to perform an I/O operation determining whether a restore is in progress. The method further includes the step of determining whether the at least one track of data is indicated as having a protected status from the I/O operation being carried out on the at least one track. And the method includes the step of selectively either carrying out the I/O operation or accounting for the I/O operation separate from the at least one track of data.

In an alternative embodiment, the invention includes a system for carrying out method steps. In another alterative embodiment, the invention includes a program product for carrying out the method steps.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The method, apparatus, and system of the present invention are each intended for use with data storage systems, such as the Symmetrix Integrated Cache Disk Array system available from EMC Corporation of Hopkinton, Mass., but is not limited to such a system.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system described below beginning with reference to FIG. 1. One aspect of the invention is embodied as a method that is described below with detailed specificity in reference to FIGS. 4–8.

Figure 1:
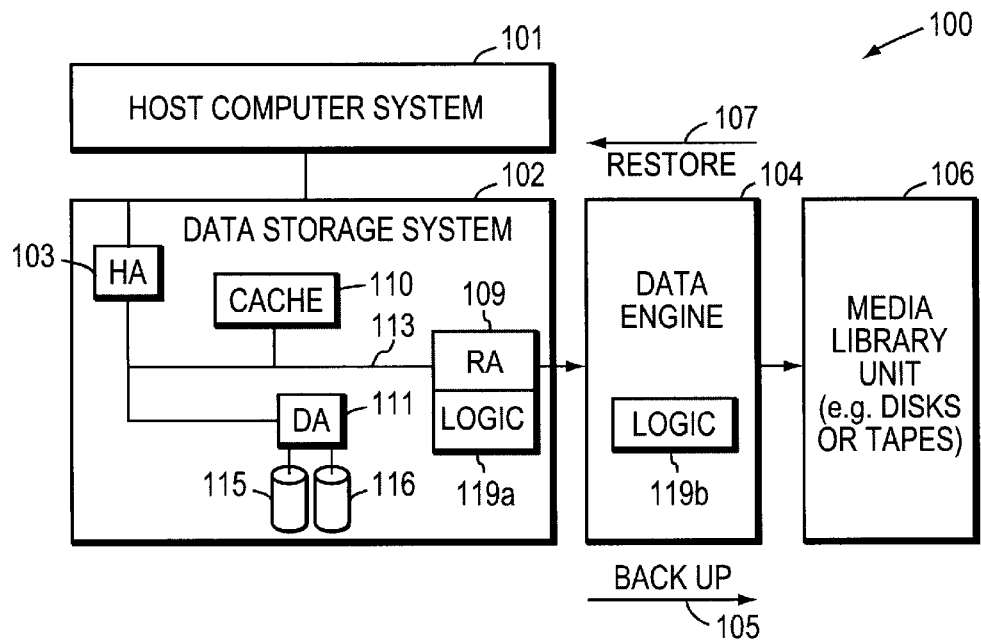
FIG. 1 is a block diagram of a data storage network including at least one host computer system, a data storage system, a data engine, and a media library and also including logic for enabling the method of the present invention.

Data Storage Environment Including Logic For Carrying Out the Preferred Method Referring now to FIG. 1, reference is now made to a data storage network 100 in which the invention is particularly useful and includes a Data Storage System 102, host Computer System 101, Data Engine 104, and Media Library Unit 106. Such Media may include disks or tapes or other type of media including such a type not currently known, and for an efficient restore operation disks are preferred in operation of this invention.

In a preferred embodiment the data storage system is a Symmetrix Integrated Cache Disk Arrays available from EMC Corporation of Hopkinton, MA. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

Generally, a Data Engine is a specialized computer for quickly moving and handling data and may include one or more data mover computers (specialized computers themselves for moving data), storage disks, communication paths, and one or more power supplies. In a preferred embodiment, the Data Engine may be an EMC Fastrax Data Engine also available from EMC Corporation of Hopkinton, Mass. Such a Data Engine is described in "Fastrax Technical Specifications" available from EMC; however the invention is not limited to such an embodiment. A Fastrax Data Engine is also described in an engineering white paper, dated Aug. 17, 2002 and available on the internet website www.emc.com and entitled "EMC Fastrax Technology Overview."

The invention is useful in an environment wherein data is normally backed up to a media library unit 106, which may be tapes or disks. Backup normally occurs with data following in the direction shown by arrow 105, and restore in the direction of arrow 107, i.e., back to the data storage system or the host computer system.

The data storage system 119 includes a system memory or cache 110 and sets or pluralities 115 and 116 of multiple data storage devices or data stores. The system memory 110 can comprise a buffer or cache memory; the storage devices in the pluralities 115 and 116 can comprise disk storage devices, optical storage devices and the like. However, in a preferred embodiment the storage devices are disk storage devices. The sets 115 and 116 represent an array of storage devices in any of a variety of known configurations. A host adapter (HA) 103 provides communications between the host system 101 and the system memory 110; disk adapter (DA) 111 provides pathways between the system memory 110 and the storage device pluralities 115 and 116. A bus 113 interconnects the system memory 110, the host adapter and the disk adapter. The cache or system memory 110 is used by various elements within the respective systems to transfer information and interact between the respective host adapters and disk adapters.

Figure 2:
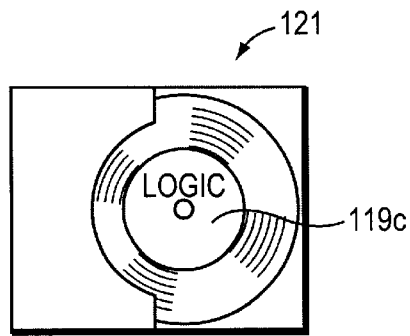
FIG. 2 is an exemplary representation of a computer-readable medium encoded with the logic of FIG. 1 for enabling the method of the present invention.

Reference is now made to FIGS. 1 and 2. Logic for carrying out the processes or method of this invention are preferably distributed among the Data Storage System and Data Engine as Logic 119a and Logic 119b, respectively. The Logic comprising Logic 119a and 199b is preferably embodied as computer software that is enabled for carrying out the method of this invention.

Using the preferred Symmetrix Integrated Cache Disk Array system available from EMC Corporation of Hopkinton, Mass. as the Data Storage System, the Logic 119a is preferably configured as microcode that communicates with the known Symmetrix API (not shown) that includes specifications for communicating therewith are available from EMC. However, as will be apparent to one skilled in the relevant computer arts in view of the flow diagrams presented with reference to FIGS. 4–9, such an implementation of the Logic 119a is not required for enabling the invention. Nevertheless in the preferred embodiment, Logic 119a is configured to operate as an inclusion of an Remote Adapter (RA), which is part of the preferred Symmetrix data storage system. The RA 109 communicates over bus 113 with DA 111 for controlling and accessing storage device pluralities 115 and 116.

In a preferred Symmetrix Data Storage System, the remote adapter or RA 109 may be typically employed for communication with remote data facilities ("RDF"), for example, connection to another storage device to maintain a mirror redundancy group, but it may also be employed as the inventor has recognized with the Data Engine 104. One form of RDF link and method of implementation is described in various publications available from EMC Corporation, including SYMMETRIX Remote Data Facility Product Manual, P/N 200-999-554, rev. B, June 1995. RDF embodiments are also described in U.S. Pat. No. 5,544,347 (Yanai), which is hereby incorporated herein by reference in its entirety. It should be appreciated, however, that the present invention is not limited to the use of RDF or to a system that employs SYMMETRIX disk arrays, and can be employed with any of numerous other types of storage systems Referring again to FIG. 1, Logic 119b may be stored in computer memory in the Data Engine as shown in FIG. 1 or reside elsewhere including on a computer readable medium 121 as shown in FIG. 2. The Logic may be enabled in a choice of computer program languages as will be apparent to one skilled in the art in view of the flow logic diagrams of FIGS. 4 and 9. It is preferably enabled to communicate with Logic 119a and the storage device pluralities 115 and 116 through the DA.

As shown in FIG. 2, the Logic may be included and enabled to operate from a computer-readable medium such as CD-ROM 121 encoded with Logic 119c that acts in cooperation with normal computer electronic memory as is known in the art. Logic 119c may be configured with all or at least a portion of Logic 119a and 119b for carrying out and enabling the method of FIG. 4–9. Nevertheless, one skilled in the relevant computer-related arts will recognize that the Logic comprising 119a-b or 119c may be implemented interchangeably as hardware or software may be implemented in various fashions in accordance with the teachings presented herein.

Generally speaking, the data storage system 102 operates in response to commands from one or more computer or host systems, such as the host system 101 connected via a host adapter, such as host adapter 103. The host adapter 103 transfers commands to a command buffer that is part of system memory 110. The command buffer stores data structures and write requests that the disk adapters generate. The disk adapters, such as DA 11 respond by effecting a corresponding operation using the information in a command buffer. The selected disk adapter then initiates a data operation. Reading operations transfer data from the storage devices to the system memory 110 through a corresponding disk adapter and subsequently transfer data from the system memory 110 to the corresponding host adapt when the host system 101 initiates the data writing operation.

The host computer system 101 may be any conventional computing system, each having an operating system, such as a system available from Sun Microsystems, and running the Solaris operating system (a version of Unix), an HP system running HP-UX (a Hewlett-Packard client, running a Hewlett-Packard version of the Unix operating system) or an IBM system running the AIX operating system (an IBM version of Unix) or any other system with an associated operating system such as the Microsoft WINDOWS NT or WINDOWS 2000 operating system.

Figure 3:
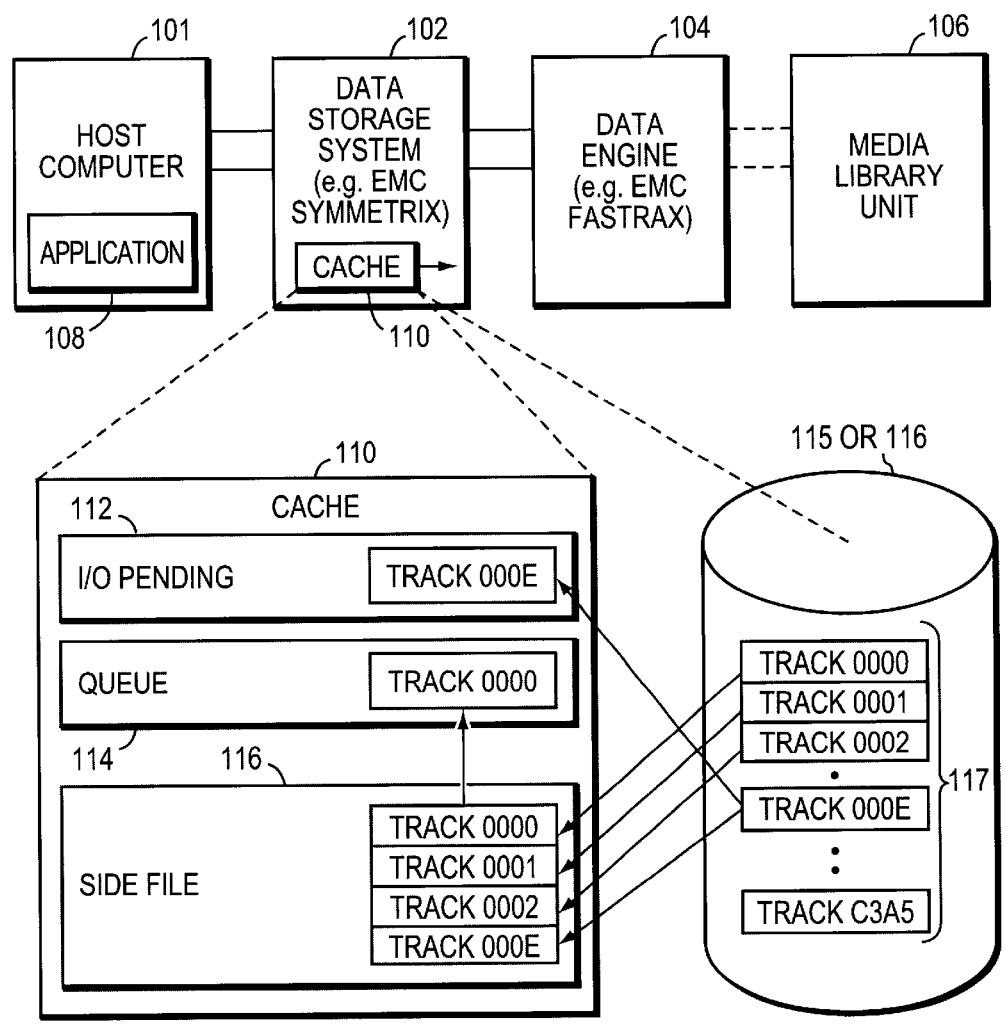
FIG. 3 is another representation of the network and systems of FIG. 1 showing queues and other data structures including a sidefile that are used with the logic of FIG. 1 for carrying out the method of this invention.

Referring to FIG. 3, an overview of the system configured for operation of the invention is schematically diagrammed. The host computer 101 may include a software application 108, e.g. a database application that has data stored on tracks collectively represented as group 117 on the plurality of storage devices 115 or 116 and for which cache 110 is in communication through bus 113 (FIG. 1). Cache 110 may store at a given instance of time representations of the tracks on the storage devices in a sidefile 116, and a queue 114 used for managing I/O requests as well as an I/O pending data structure 112. In general the sidefile and queue are also data structures for managing the I/O actions for tracks as restore operations are taking place. A consistent copy of data may be kept while applications such as application 108 continue to update the data operations for which are accounted for in the sidefile 116. Thus for a database application related tables, files and data sets may be synchronized. An intercept of I/O's pending ensures that updates are not included in the data copy being restored, but synchronization afterwards ensures that such operations are accounted for in production data.

Overview of Method

Now for a better understanding of the method steps of this invention an overview is now given.

In the preferred embodiment, the Logic 119a and 119b handle a concurrent I/O operation session for implementing an efficient restore operation denoted as a "concurrent restore." An interception mechanism is employed to handle I/O operations while a concurrent restore tasks place. A so-called special task denoted as a "concurrent restore special task" is implemented by the Logic to handle such a situation and to manage completion of queue information. Fastrax recalls such information from its memory and can send it along with the restore command. Also in a preferred embodiment the collective Logic includes program code to check or clear any protection bits on such a restore operation.

In the preferred embodiment, when a concurrent restore session is created in the Symmetrix, a protection bit is set per track in the restore. A bit is set in the device ready state indicating the device is in the middle of a concurrent restore session.

There is an interception mechanism for host I/O on tracks protected for concurrent restore. It is carried out as follows. When the Host computer carries out an I/O operation such as I/O writes/reads to a device that is in the middle of concurrent restore, the Host checks for any protection bits on the tracks before the I/O operation may be performed on the track. If the track is protected then I/O is halted (disconnected) and a read request is sent to the Fastrax group associated with the first protection bits set for the track to finish all restore activity on the track.

In the preferred embodiment using the Symmetrix API's and relevant microcode, this creates a wait task that waits for the protection bits to clear. When the HA receives status it sends a read request for the next protected track. When all protection bits are cleared, the I/O resumes.

The general operation of concurrent restore commands follows. The Host may check that session exists and that a concurrent restore is in progress, for example, the bit denoted as the CONCURRENT_RESTORE_IN_PROGRESS bit may be in the device ready state to indicate such a situation exists. The Host then must check that the track for which the I/O operation is pending is protected for that session. A mechanism for locking the data may be employed, e.g., a slot lock, which may be used for restoring such data, and then the protection, bit for that session may be cleared once the restore operation is complete.

Protection bits are set by the certain system calls by Logic 119a, and counterpart Logic 119 in the preferred Fastrax Date Engine determines when a protection bit will be cleared by setting a flag in the restore command. In the preferred embodiment, protection bits are set at a track-level but restore requests may be implemented at a data block level (e.g. in a fixed block architecture also known as FBA). When a protection bit is set for a track, the DA in the Data Storage System cannot use the protected track for I/O operations, e.g. read/write.

In general the host computer starts a concurrent restore function by issuing the proper command request to the data storage system. In turn the data storage system creates a concurrent restore session and sets protection bits for the tracks in the extent of the restore. The CONCURRENT_RESTORE_IN_PROGRESS bit is set with the ready state of the device. Then the host is notified that the concurrent restore has been "defined". The host can now perform read/write operations on protected tracks. Tracks are restored asynchronously by the preferred Fastrax Data Engine or synchronously in case of a host request.

Importantly, the system resources do not have to wait for the restore to complete to carry out I/O operations, which are accounted for separately from the data itself and then a synchronization occurs following completion of the restore.

Detailed Method Steps

Figure 4:
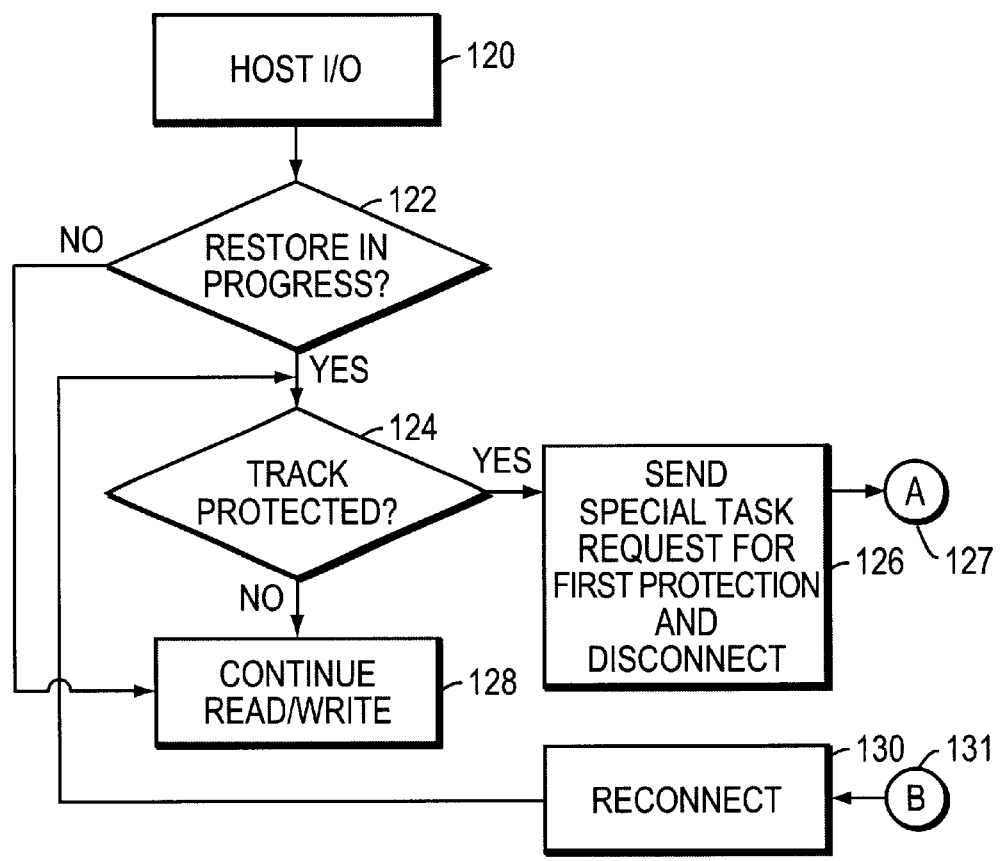
FIG. 4 is a flow logic diagram illustrating method steps of the invention carried out by the logic of this invention.

Steps for an efficient restore operation are now described in detail with reference to FIGS. 4–8. Referring to FIG. 4, in step 120 a host I/O operation from host 101 is handled. Step 122 determines whether a restore operation is in progress then processing flows to Step 124, wherein a check is made to determine if the track requested for the host operation is protected. If a restore operation is not in progress, then the operation may continue to perform the respective read or write command, which is the subject of the host I/O operation. Then processing flows back to Step 124. In either case, when step 124 is processed, if the track is not protected then a loop is performed as shown in FIG. 4 until the track is protected. In that case, a special task request for first protection and disconnect is sent and processing flows to step 127, which is a continuation stage A that connects to its identical counterpart shown in FIG. 5.

Figure 5:
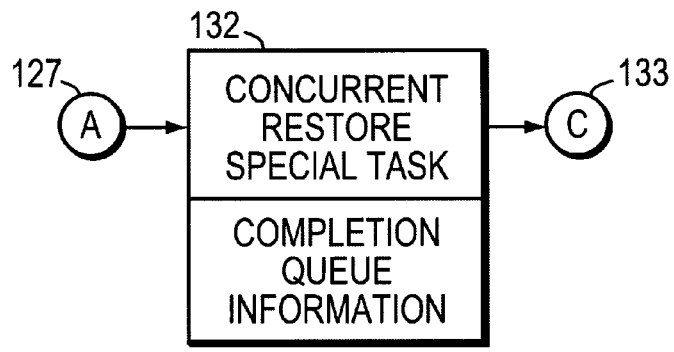
FIG. 5 is another flow logic diagram illustrating method steps of the invention carried out by the logic of this invention.

Reference is now made to FIG. 5., wherein step 127 flows into step 132. The step 132 the special task is denoted as a concurrent restore is begun, and the step includes a completion of queue information, and then processing flows to step 133, which is a continuation stage C that connects with its identical counterpart shown in FIG. 7.

Figure 6:
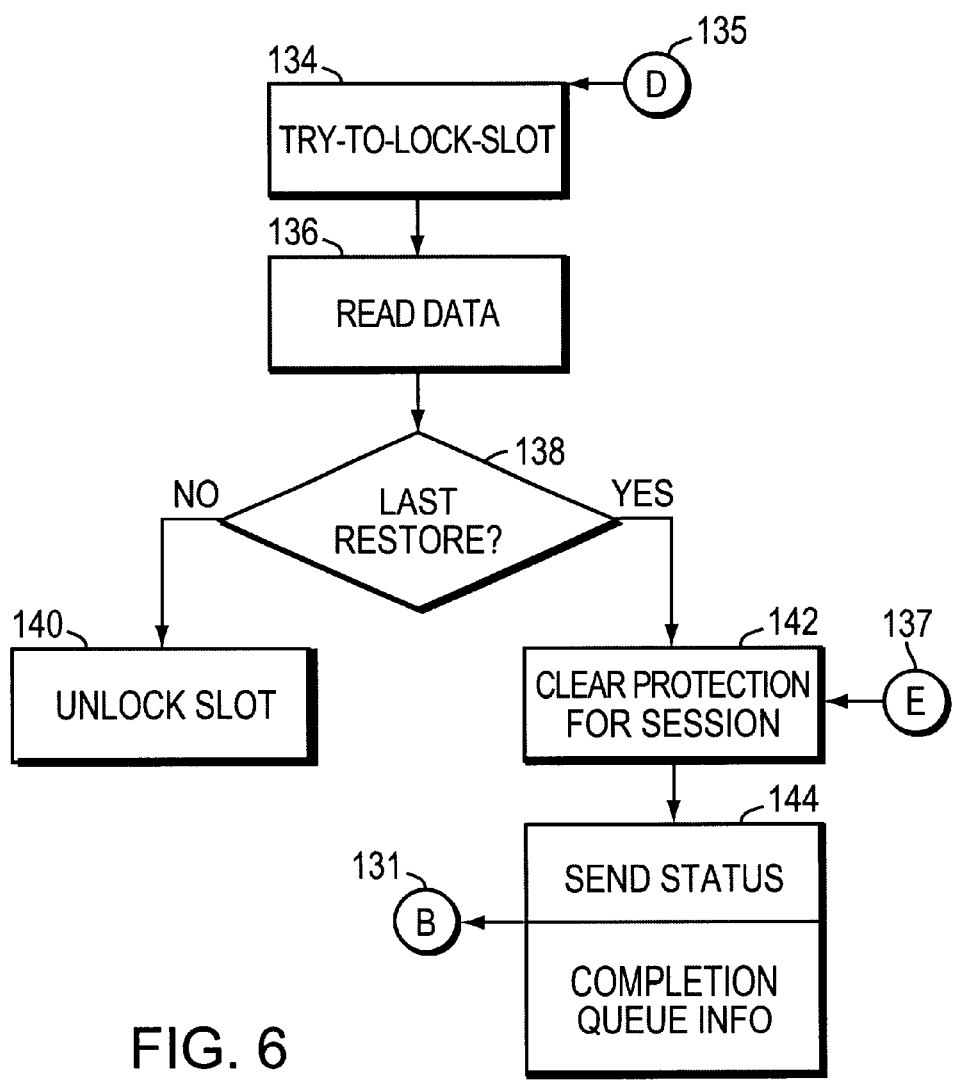
FIG. 6 is another flow logic diagram illustrating method steps of the invention carried out by the logic of this invention.

Reference is made in this paragraph 2 to FIGS. 6 and 4. Reference is now made to FIG. 6, wherein step 134 includes a step of trying to lock the slide (try_to_lock_slot). Step 136 is a read of data. Step 138 poses a question inquiring whether this operation is the last restore. If the answer is no, the slot is unlocked in step 140. If the answer is Yes, than in step 142 protection is cleared for the session (step 137 which is a continuation stage "E" that logically flows from its identical counterpart shown in FIG. 7). Step 144 includes a sending of status and completion of the queue info, processing then flows into step 131, which is continuation stage "B" that connects with its identical counterpart shown in FIG. 4. In FIG. 4, processing flows into step 130, which carries out a reconnect, and then processing flows back into the loop including the inquiry of step 124.

Figure 7:
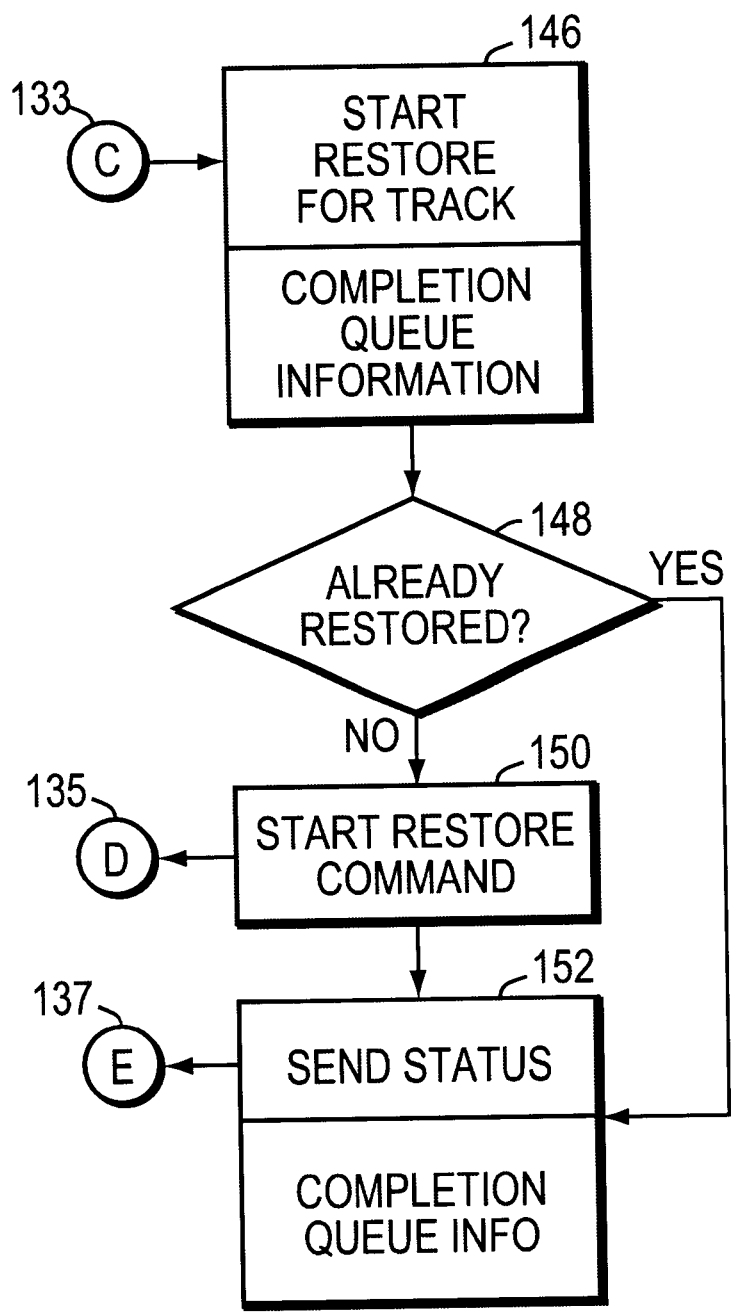
FIG. 7 is another flow logic diagram illustrating method steps of the invention carried out by the logic of this invention.

Referring to FIG. 7, continuation step 133 (see FIG. 5) leads to step 146. step 146 includes a start restore for track and completion of queue information. A query is carried out in step 148 to determine whether the track is already restored. If the answer is no, then the restore command is started in step 150 and processing flows to step 135 including continuation stage D which flows back into the logic shown in 6. If the answer is Yes, then processing flows to step 152. In step 152 status information is sent and queue information is completed. Processing then flows to step 137, which is a continuation stage "E," which connects to its identical counterpart shown in FIG. 6 and which flows into step 142.

Figure 8:
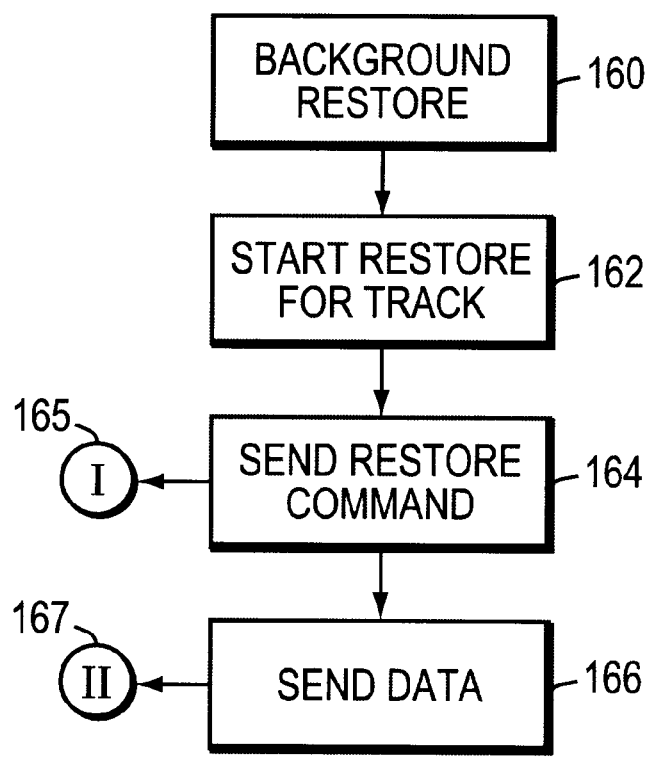
FIG. 8 is another flow logic diagram illustrating method steps of the invention carried out by the logic of this invention.
Figure 9:
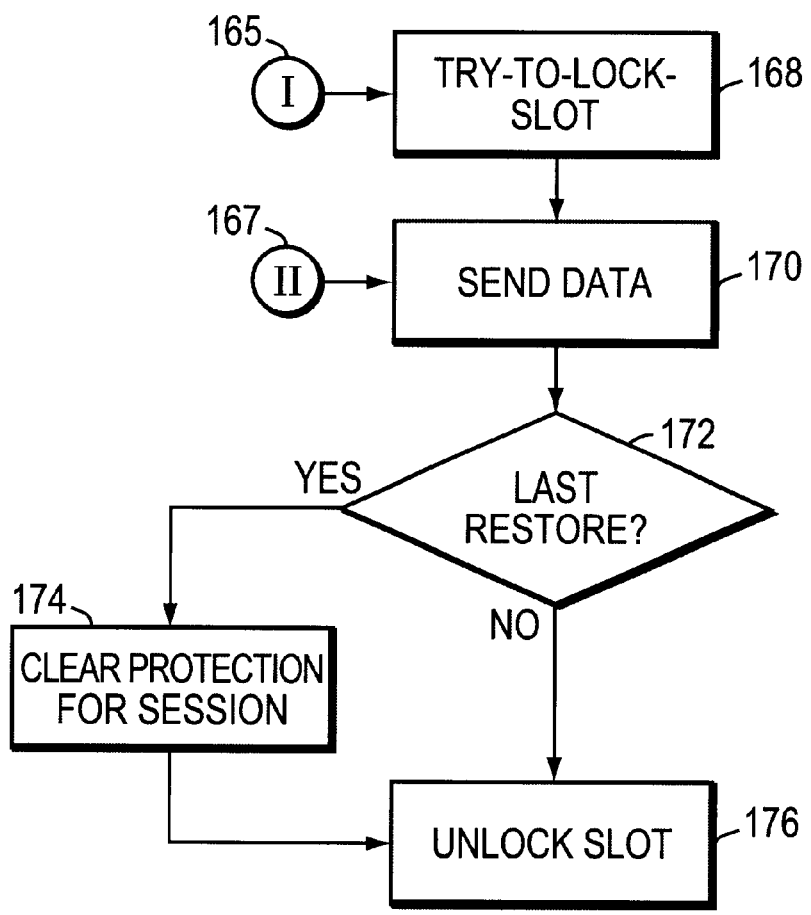
FIG. 9 is another flow logic diagram illustrating method steps of the invention carried out by the logic of this invention.

Reference is now made to FIGS. 8 and 9. In FIG. 8, a background restore is begun in step 160. In step 162, a restoration to start for the track. A send of the restore command occurs in step 164 and processing flows into step 165, which is a continuation stage I that connects with its identical counterpart shown in FIG. 9. A send of the data occurs in step 166 and processing flows into step 167, which is a continuation stage II that connects with its identical counterpart shown in FIG. 9.

Referring to FIG. 9, step 168 tries to lock the slot associated with the track (try_to_lock_slot). Data is sent in step 170. Step 152 poses a question to determine whether this is the last restore. If the answer is Yes, and protection is cleared for the session's step 174 and the slot is unlocked in step 176. The latter step is reached without processing step 174 is the answer is no.

A system and method has been described for performing an efficient restore operation in a data storage environment. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for performing a restore operation for data stored in a data storage environment, the method comprising the steps of:

receiving a request to perform an I/O operation on at least one track of data; in response to receiving the request to perform an I/O operation determining whether a restore is in progress;

in response to determining that such a restore is in progress determining whether the at least one track of data is indicated as having a protected status from the I/O operation being carried out on the at least one track; and in accordance with the determination of whether the at least one track is protected, selectively either carrying out the I/O operation or accounting for the I/O operation separate from the at least one track of data.

2. The method of claim 1, wherein the accounting for the I/O operation separate from the at least one track of data includes manipulation of a queue for handling of information related to the accounting of the I/O operation.

3. The method of claim 2, wherein the I/O operation is either a read or write operation.

4. The method of claim 1, wherein the restore operation completes while the at least one track remains protected.

5. The method of claim 4, wherein the track is unprotected following completion of the restore operation and the data is changed to compensate for the I/O operation requested while the restore operation was being carried out.

6. The method of claim 2, wherein the restore operation completes while the at least one track remains protected.

7. The method of claim 6, wherein the track is unprotected following completion of the restore operation and the data is changed to compensate for the I/O operation requested while the restore operation was being carried out.

8. The method of claim 7, wherein the I/O operation is either a read or write operation.

9. A computer system comprising:

a data storage system including a plurality of storage devices;

a computer system in communication with the data storage system;

a data engine in communication with the data storage system;

a media library in communication with the data engine; and computer-executable logic in communication with the data storage system and the data engine that enables the method steps of:

the computer system requesting to perform an I/O operation on at least one track of data;

the logic responding to the request to perform an I/O operation by determining whether a restore operation of data from the media library to the data storage system or computer system is in progress;

in response to determining that such a restore is in progress, the logic determining whether the at least one track of data is indicated as having a protected status from the I/O operation being carried out on the at least one track; and in accordance with the determination of whether the at least one track is protected, the logic selectively either carrying out the I/O operation or accounting for the I/O operation separate from the at least one track of data.

10. The system of claim 9, wherein the accounting for the I/O operation separate from the at least one track of data includes manipulation of a queue for handling of information related to the accounting of the I/O operation.

11. The system of claim 10, wherein the I/O operation is either a read or writes operation.

12. The system of claim 9, wherein the restore operation completes while the at least one track remains protected.

13. The system of claim 12, wherein the track is unprotected following completion of the restore operation and the data is changed to compensate for the I/O operation requested while the restore operation was being carried out.

14. The system of claim 10, wherein the restore operation completes while the at least one track remains protected.

15. The system of claim 14, wherein the track is unprotected following completion of the restore operation and the data is changed to compensate for the I/O operation requested while the restore operation was being carried out.

16. The system of claim 15, wherein the I/O operation is either a read or writes operation.

17. The system of claim 9, wherein the media library contains a plurality of disks.

18. A program product for use with a data storage system having a plurality of storage devices and which is in communication with a computer system, a data engine, and a media library unit, the program product being for carrying out a restore operation and being comprised of:

computer-executable logic that is configured for causing the following computer-executed steps to occur:

receiving a request to perform an I/O operation on at least one track of data;

in response to receiving the request to perform an I/O operation determining whether a restore is in progress;

in response to determining that such a restore is in progress determining whether the at least one track of data is indicated as having a protected status from the I/O operation being carried out on the at least one track; and in accordance with the determination of whether the at least one track is protected, selectively either carrying out the I/O operation or accounting for the I/O operation separate from the at least one track of data.

19. An apparatus for performing a restore operation for data stored in a data storage environment, the apparatus comprising:

a data storage system including a plurality of storage devices;

a computer system in communication with the data storage system;

a data engine in communication with the data storage system;

a media library in communication with the data engine; and wherein the apparatus includes means responsive to a request from the computer system to perform an I/O operation on at least one track of data by determining whether a restore operation of data from the media library to the data storage system or computer system is in progress;

means responsive to determining that such a restore is in progress by determining whether the at least one track of data is indicated as having a protected status from the I/O operation being carried out on the at least one track; and means for selectively either carrying out the I/O operation or accounting for the I/O operation separate from the at least one track of data in accordance with the determination of whether the at least one track is protected.

* * * * *